United States Patent
Bhatia et al.

(10) Patent No.: US 9,218,332 B2
(45) Date of Patent: Dec. 22, 2015

(54) METHOD AND SYSTEM FOR AUTO-POPULATING ELECTRONIC FORMS

(71) Applicant: LinkedIn Corporation, Mountain View, CA (US)

(72) Inventors: Meera Gill Bhatia, San Francisco, CA (US); Guangyu Dong, Santa Clara, CA (US); Sanjay Kshetramade, Fremont, CA (US); Douglas James Myers, San Mateo, CA (US); Sophia H. Nguyen, Stanford, CA (US); Aviad Pinkovezky, Los Altos, CA (US); Vikram Rangnekar, Saratoga, CA (US); Brian Rumao, San Francisco, CA (US)

(73) Assignee: LinkedIn Corporation, Mountain View, CA (US)

( * ) Notice: Subject to any disclaimer, the term of this patent is extended or adjusted under 35 U.S.C. 154(b) by 57 days.

(21) Appl. No.: 14/160,080

(22) Filed: Jan. 21, 2014

(65) Prior Publication Data
US 2015/0205776 A1    Jul. 23, 2015

(51) Int. Cl.
| G06F 17/00 | (2006.01) |
| G06F 17/24 | (2006.01) |
| H04L 29/06 | (2006.01) |
| G06F 17/22 | (2006.01) |
| G06Q 50/00 | (2012.01) |

(52) U.S. Cl.
CPC .......... *G06F 17/243* (2013.01); *G06F 17/2247* (2013.01); *G06Q 50/01* (2013.01); *H04L 65/403* (2013.01)

(58) Field of Classification Search
CPC ... G06F 17/243; G06F 17/2247; G06Q 50/01; H04L 65/403
USPC .................................................. 715/221–226
See application file for complete search history.

(56) References Cited

U.S. PATENT DOCUMENTS

| 6,401,077 B1 * | 6/2002 | Godden et al. ............... 705/26.8 |
| 6,651,217 B1 * | 11/2003 | Kennedy et al. ............... 715/224 |
| 7,334,184 B1 * | 2/2008 | Simons ......................... 715/234 |
| 8,374,929 B1 * | 2/2013 | Lappas et al. ................... 705/34 |
| 2002/0013788 A1 * | 1/2002 | Pennell et al. ................ 707/507 |
| 2013/0036172 A1 * | 2/2013 | Chan et al. ..................... 709/204 |
| 2013/0252595 A1 * | 9/2013 | Mairs et al. .................... 455/415 |

* cited by examiner

*Primary Examiner* — Thu Huynh
(74) *Attorney, Agent, or Firm* — Schwegman Lundberg & Woessner, P.A.

(57) ABSTRACT

An autofill system is described for auto-populating electronic forms with data stored by an on-line social networking system. When a member of an on-line social network system accesses, via a web browser, an autofill-enabled web page, the autofill system determines an identification of the member, scrapes the member's profile to obtain member's information, assembles the member's profile information as member data, and communicates the member data to the web browser together with a script for presenting an autofill button on the web page.

20 Claims, 6 Drawing Sheets

FIG. 5

METHOD AND SYSTEM FOR AUTO-POPULATING ELECTRONIC FORMS

TECHNICAL FIELD

This application relates to the technical fields of software and/or hardware technology and, in one example embodiment, to the system and method to auto-populate electronic forms with data stored by an on-line social networking system.

BACKGROUND

Online lead generation is a term that refers to a form of Internet marketing that is aimed at generating prospective customer interest. A marketing team may utilize a website that presents to a user (who may be a member of the website or a guest) an electronic form and a request to fill the electronic form with the user's information. A user that is visiting a marketer's web site may fill out the form, but may also choose to not do so even if they are willing to share this information, as the process of filling out such forms may be perceived by the user as lengthy and tedious.

BRIEF DESCRIPTION OF DRAWINGS

Embodiments of the present invention are illustrated by way of example and not limitation in the figures of the accompanying drawings, in which like reference numbers indicate similar elements and in which:

FIG. 5 is an example user interface (UI) that includes an autofill button to auto-populate electronic forms with data stored by an on-line social networking system, in accordance with an example embodiment.

DETAILED DESCRIPTION

Figure 1:
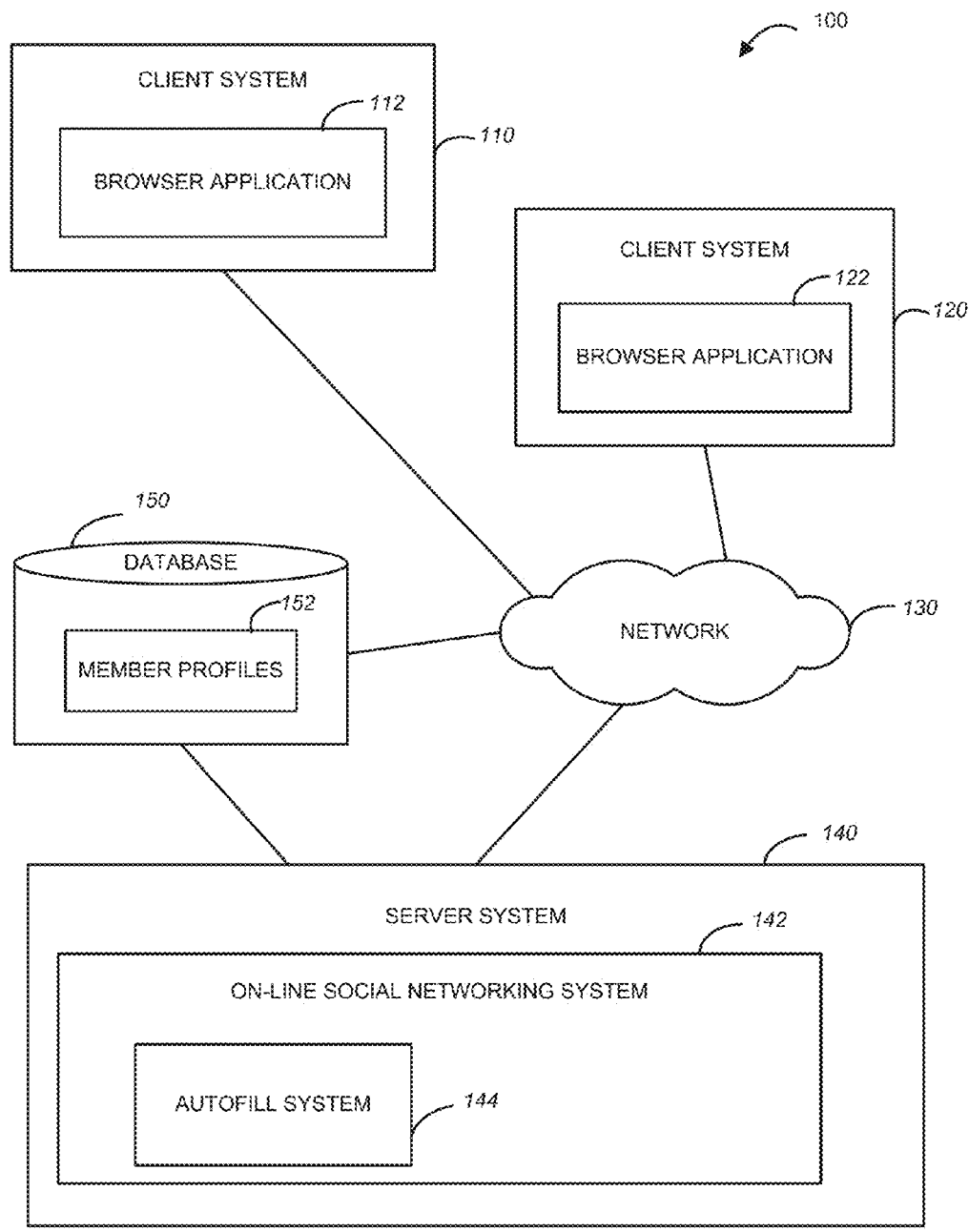
FIG. 1 is a diagrammatic representation of a network environment within which an example method and system to auto-populate electronic forms with data stored by an on-line social networking system may be implemented.

A method and system to auto-populate electronic forms with data stored by an on-line social networking system is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

An on-line social network may be viewed as a platform to connect people in virtual space. An on-line social network may be a web-based platform, such as, e.g., a social networking web site, and may be accessed by a user via a web browser. It will be noted that, for the purposes of this description, the terms web browser, browser application, and browser are used interchangeably. An on-line social network may be a business-focused social network that is designed specifically for the business community, where registered members establish and document networks of people they know and trust professionally. Each registered member may be represented by a member profile. A member profile may be represented by one or more web pages. A member profile is used to store information associated with the member, such as, e.g., personal information, professional information, member's likes and preferences, etc. A member's profile web page of a social networking web site may emphasize employment history and education of the associated member. For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

As mentioned above, a marketing company may present on their web site an electronic form (that may be termed a lead generation form) and request that users fill out the electronic form with their information. An example method for auto-populating electronic forms comprises providing, on the web page that displays a lead generation form, a user interface (UI) object that can be used to cause the lead generation form to be filled automatically with data stored by an on-line social networking system, of which the user is a member. Such UI object may be termed an autofill button. In one embodiment, using an autofill button to auto-populate lead generation forms may lower the friction in the process of users submitting their information electronically and may result in the increased conversion rate, which, in turn, may lead to increased performance on the part of sales and marketing teams that utilize an associated UI object on their web pages.

An autofill button and the associated autofill functionality may be provided by an autofill system that may be included in or cooperate with an on-line social networking system. A web page may be referred to as autofill-enabled if it permits inclusion of an autofill button that can be activated to cause populating a form presented on the web page with data obtained from an on-line social networking system. A screenshot of a UI 500 that includes an autofill button is shown in FIG. 5.

An example method and system to auto-populate electronic forms with data stored by an on-line social networking system may be implemented in the context of a network environment 100 illustrated in FIG. 1. As shown in FIG. 1, the network environment 100 may include client systems 110 and 120 and a server system 140. The server system 140, in one example embodiment, may host an on-line social networking system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may run respective browser applications, such as, e.g., a browser application 112 a browser application 122 and may have access to the server system 140 via a communications network 130. The communications network 130 may be a public network (e.g., the Internet, a mobile communication network, or any other network capable of communicating digital data). As shown in FIG. 1, the server system 140 also hosts an autofill system 144, which may be part of the on-line social networking system 142. In one example embodiment, the autofill system 144 is configured to auto-populate electronic forms with data stored by the on-line social networking system 142.

In operation, the on-line social network system 142 may store cookies in the browser of a member's client device (e.g., in the browser 112) that permit the on-line social networking system 142 to detect that the member has accessed an autofill-enabled web page. When the member accesses an autofill-enabled web page, the autofill system 144 determines an identification of the member with respect to the on-line social networking system 142, scrapes the member's profile stored in the database 150 to obtain member's information, assembles the member's profile information as member data and communicates the member data to the browser 112 together with a script for presenting an autofill button on the web page. This scenario is applicable where a member who is visiting an autofill-enabled web page is already logged into the on-line social networking system 142. Where the member is not logged in, the autofill system 144 communicates to the browser 112 a UI object for logging into the on-line social networking system 142 and, once the member is logged-in, assembles the member's profile information as member data and communicates the member data to the browser 112 together with a script for presenting an autofill button on the web page.

The autofill button may be configured to detect when it has been activated (e.g., a user has clicked on the button), analyze the form presented on the web page to determine which fields in the form have been tagged to be populated with the data from the on-line social networking system 142, and auto-populate those tagged fields with the member data that have been communicated to the browser 112 together with the script for presenting the autofill button. It will be noted that a form presented on an autofill-enabled web page may have some, all, or none of its fields tagged. A tag that indicates that the associated field can be auto-populated with the member data may be termed an autofill tag. An autofill tag associated with a form field provides a mapping between the field and an item from the member profile. The script that represents the autofill button is executed to parse the form to detect any autofill tags, and use the mapping information to determine which items from the member data are to be used for populating respective tagged form fields. The mapping information may be stored in the browser 112, or it can be communicated to the browser 112 together with the script representing an autofill button on the web page and the member's profile data (member data).

In some embodiments, the autofill system 144 may be configured to collect analytics with respect to the lead generation process. For example, an analytics script may be executing in the browser 112 that tracks events with respect to an autofill-enabled web page and reports the events to the server system 140 hosting the on-line social networking system 142, where this data can be processed and/or provided to the provider of the autofill-enabled web page. The events tracked in the browser 112 may include events indicative of a user filling out the form (manually or automatically), a user submitting the form, or a user choosing to abandon the form-filling process. Other information tracked by the analytics script may be data associated with various characteristics of the member, such as, e.g., first and last name, e-mail address, phone number, company name, position or title, industry, function, city, state, region, country, skills, education, as well as demographic, professional occupation, likes and preferences that may be gleaned from the member profile, etc. An example autofill system is illustrated in FIG. 2.

Figure 2:
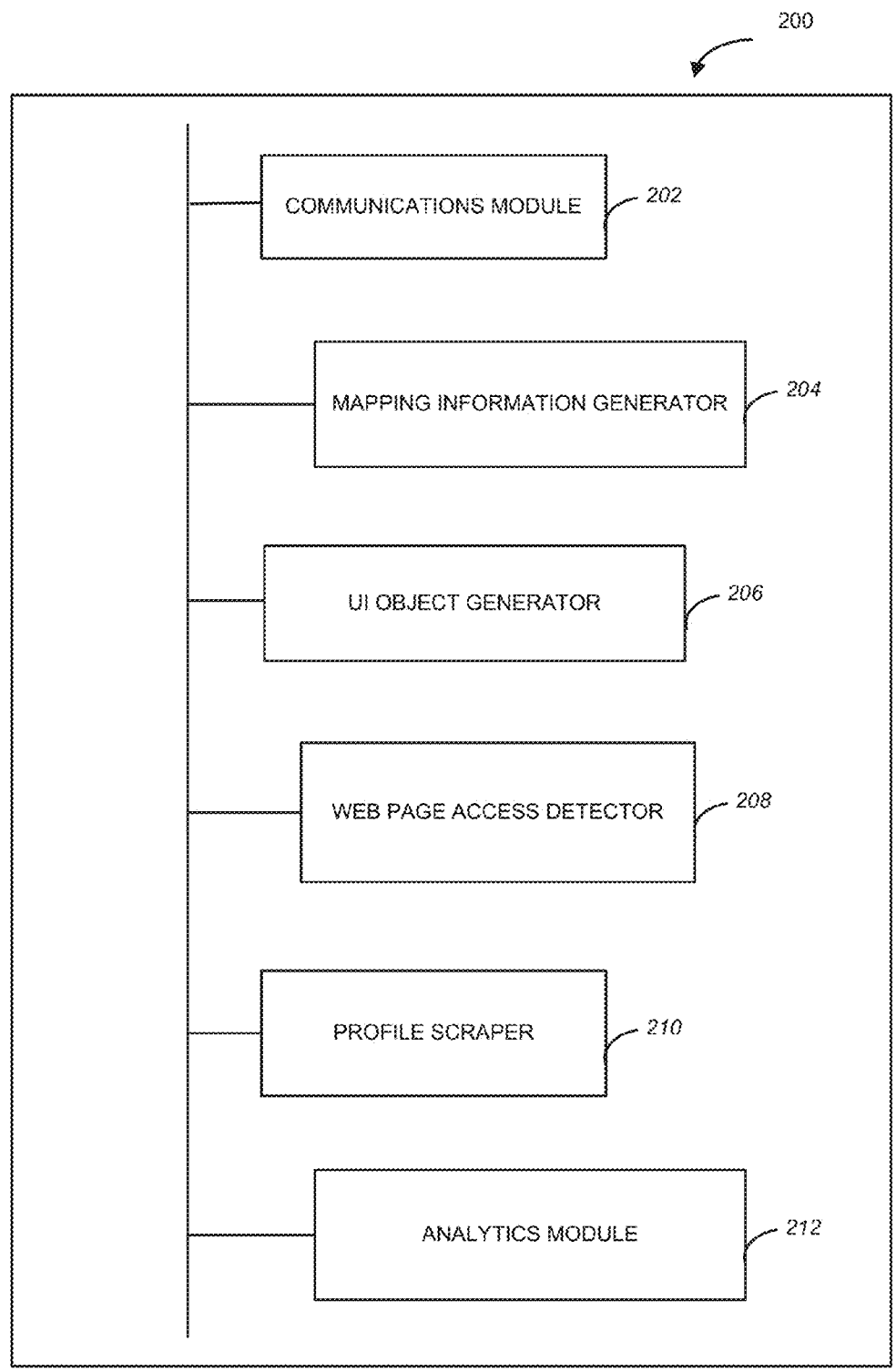
FIG. 2 is block diagram of a system to auto-populate electronic forms with data stored by an on-line social networking system, in accordance with one example embodiment.

FIG. 2 is a block diagram of a system 200 to auto-populate electronic forms with data stored by an on-line social networking system, in accordance with one example embodiment. As shown in FIG. 2, the system 200 includes a communications module 202, a mapping information generator 204, and a UI object generator 206. The communications module 202 may be configured to communicate to the browser 112 of FIG. 1 a browser cookie to permit the on-line social networking system 142 of FIG. 1 to detect that a member of the on-line social networking system is accessing an autofill-enabled web page. As explained above, an autofill-enabled web page may present a leads generation form. Some or all of the fields in the form presented on an autofill-enabled form may be tagged with autofill tags that may be used to determine respective data items that can be automatically included into the tagged fields. The communications module 202 may also be configured to communicate to the browser 112 information from the profile information of the member that is stored by the on-line social networking system 142, the member data, and also mapping information that provides mapping between autofill tags and items in profiles of members of the on-line social networking system 142. The communications module 202 may also be configured to communicate, to the client 110 of FIG. 1, an analytics script that can track events with respect to an autofill-enabled web page and report the events to the server system 140 hosting the on-line social networking system 142, where this data can be processed and/or provided to the provider of the autofill-enabled web page.

The mapping information generator 204 may be configured to generate the mapping information. As mentioned above, the mapping information may be stored in the browser 112, or it can be communicated to the browser 112 together with the script for presenting an autofill button on the web page and the member's profile data. The autofill button, when activated in the browser 112 accesses the mapping information to determine data items to be used to populate the tagged fields in the form presented on the associated web page.

The UI object generator 206 may be configured to generate a UI object (the autofill button). The UI object may be presented on a web page that displays a form, as shown in FIG. 5, and may be in the form of a script that, when executed, results in populating the form with data stored by the on-line social networking system 142. Example operations performed by the script that represents an autofill button may be described with reference to FIG. 4.

Figure 4:
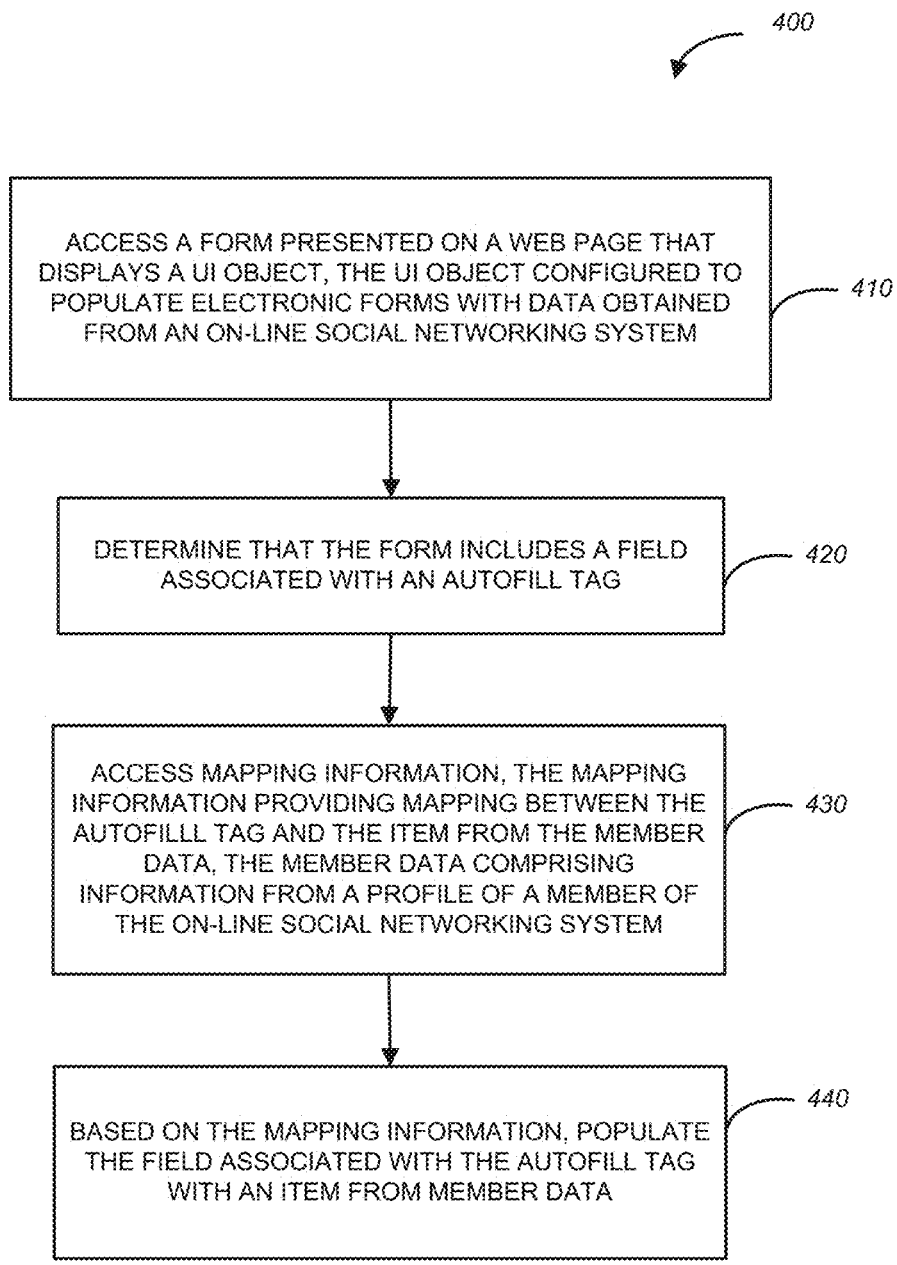
FIG. 4 is a flow chart of a method performed in a web browser to auto-populate electronic forms with data stored by an on-line social networking system, in accordance with an example embodiment.
Figure 6:
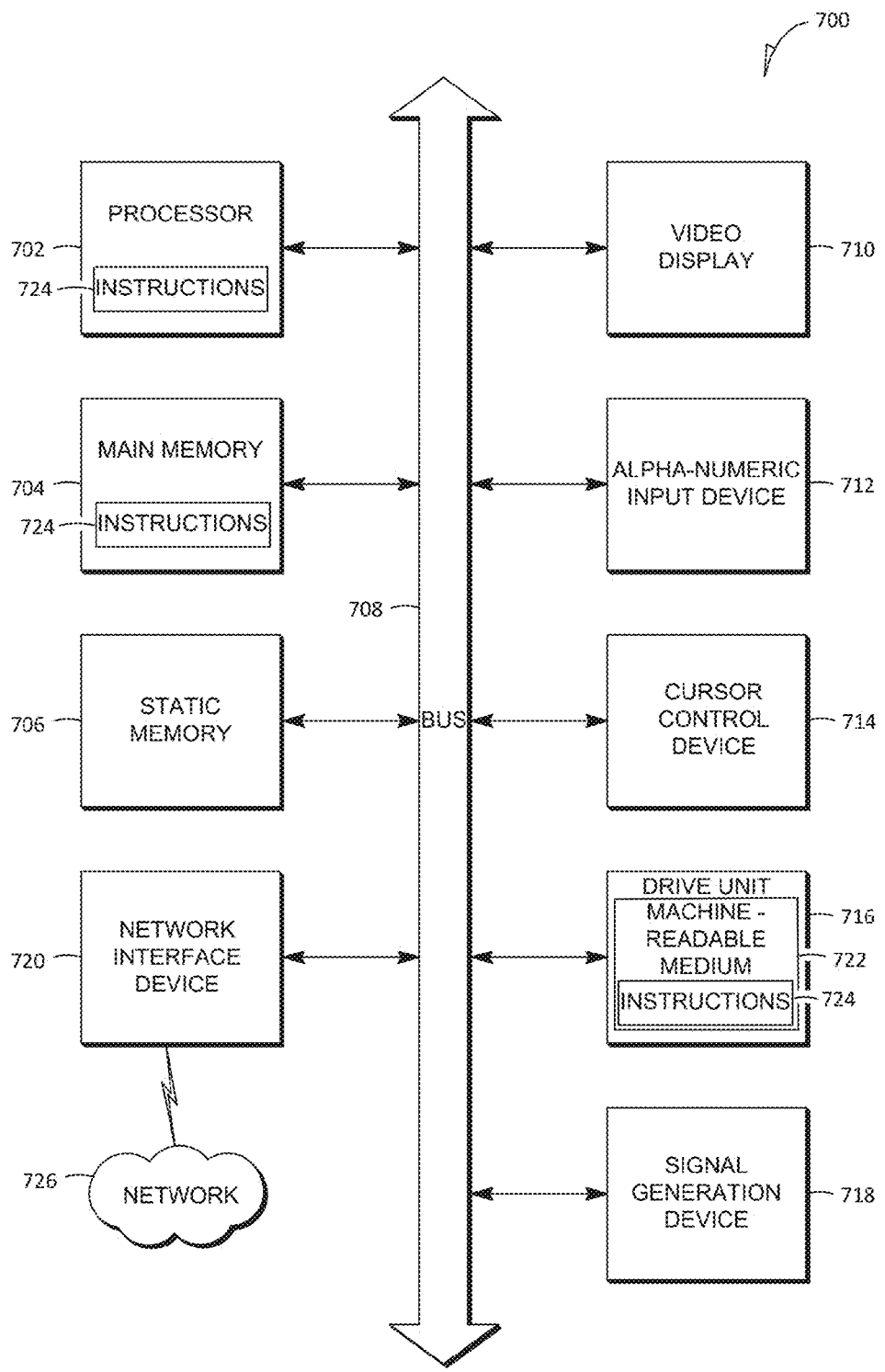
FIG. 6 is a diagrammatic representation of an example machine in the form of a computer system within which a set of instructions, for causing the machine to perform any one or more of the methodologies discussed herein, may be executed.

FIG. 4 is a flow chart of a method 400 performed in a web browser to auto-populate electronic forms with data stored by an on-line social networking system, according to one example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic is provided from the server system 140 of FIG. 1 to the browser 112 of FIG. 1.

As shown in FIG. 4, the method 400 commences at operation 410, when the script generated by the UI object generator 206 of FIG. 2 accesses a form presented on a web page that displays the associated UI object, when the UI object is activated. The UI object may be activated, e.g., when a user clicks on the UI object presented. At operation 420, the script that represents the UI object determines that the form includes a field associated with an autofill tag (a tagged field). As mentioned above, the form may have more than one of its fields tagged with autofill tags. At operation 430, the script accesses mapping information generated by the mapping information generator 204 of FIG. 2 and, based on the mapping information, populates the tagged field with an item from member data that was sent to the web browser together with the UI object (operation 440).

Returning to FIG. 2, the system 200 further includes a web page access detector 208, a profile scraper 210, and an analytics module. The web page access detector may be configured to detect that a member of the on-line social networking system 142 is accessing a web page via the web browser 112. The profile scraper 210 may be configured to obtain, from the member's profile stored by the on-line social networking system 142, member data. The analytics module 212 may be configured to obtain and process events collected by an analytics script executing in the browser 112 and make this information available to the provider of the autofill-enabled web page. As explained above, the events tracked in the browser 112 may include events indicative of a user filling out the form (manually or automatically), a user submitting the form, or a user choosing to abandon the form-filling process. Other information tracked by the analytics script may be data associated with various characteristics of the member, such as, e.g., demographic, professional occupation, likes and preferences that may be gleaned from the member profile, etc.

Figure 3:
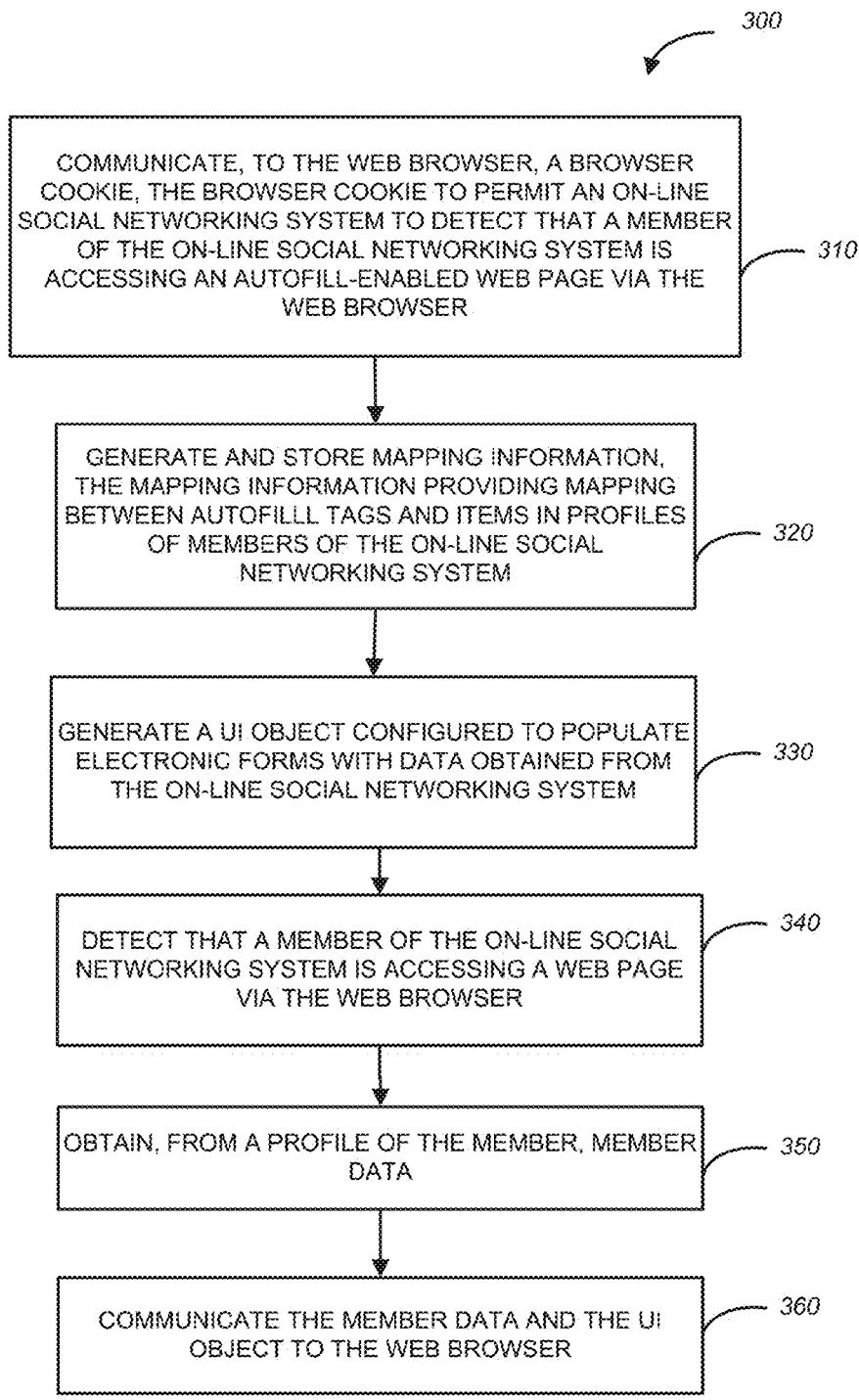
FIG. 3 is a flow chart of a method performed at a server system to auto-populate electronic forms with data stored by an on-line social networking system, in accordance with an example embodiment.

FIG. 3 is a flow chart of a method 300 performed at a server system to auto-populate electronic forms with data stored by an on-line social networking system, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the communications module 202 of FIG. 2 communicates, to the browser 112 of FIG. 1, a browser cookie, to permit the on-line social networking system 142 of FIG. 1 to detect that a member of the on-line social networking system 142 of FIG. 1 is accessing an autofill-enabled web page. At operation 320, the mapping information generator 204 of FIG. 2 generates the mapping information. The mapping information provides mapping between autofill tags and respective items from member profiled stored by the on-line social networking system 142 of FIG. 1. At operation 330, the UI object generator 206 of FIG. 2 generates a UI object (the autofill button) that may be presented on a web page that displays a form and may be in the form of a script that, when executed, results in populating the form with data stored by the on-line social networking system 142. A UI object, when activated in the browser 112 accesses the mapping information to determine data items to be used to populate the tagged fields in the form presented on the associated web page.

At operation 340, the web page access detector 208 of FIG. 2 detects that a member of the on-line social networking system 142 is accessing a web page via a web browser. The profile scraper 210 of FIG. 2 then obtains, from the profile of the member, member data. The member data may include information such as name, address, employer, year of birth, city and state of residency, etc. At operation 360, the communications module 202 communicates the UI object and the member data to the web browser. The UI object operates in the web browser as described above, with reference to FIG. 4.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

FIG. 13 is a diagrammatic representation of a machine in the example form of a computer system 1300 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 13013. The computer system 1300 may further include a video display unit 1310 (e.g., a liquid crystal display (LCD) or a cathode ray tube (CRT)). The computer system 1300 also includes an alpha-numeric input device 1312 (e.g., a keyboard), a user interface (UI) navigation device 1314 (e.g., a cursor control device), a disk drive unit 1316, a signal generation device 1318 (e.g., a speaker) and a network interface device 1320.

The disk drive unit 1316 includes a machine-readable medium 1322 on which is stored one or more sets of instructions and data structures (e.g., software 1324) embodying or utilized by any one or more of the methodologies or functions described herein. The software 1324 may also reside, completely or at least partially, within the main memory 1304 and/or within the processor 1302 during execution thereof by the computer system 1300, with the main memory 1304 and the processor 1302 also constituting machine-readable media.

The software 1324 may further be transmitted or received over a network 1326 via the network interface device 1320 utilizing any one of a number of well-known transfer protocols (e.g., Hyper Text Transfer Protocol (HTTP)).

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to auto-populate electronic forms with data stored by an on-line social networking system has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
  detecting, at a server system hosting an on-line social networking system, that a member of the on-line social networking system is accessing a web page via a web browser, the web page provided by an entity that is distinct from the on-line social networking system;
  obtaining, from the on-line social networking system, member data, the member data associated with the member of the on-line social networking system; and
  communicating the member data together with a user interface (UI) object to the web browser, the UI object configured to populate an electronic form presented on the web page with data obtained from the on-line social networking system, the UI object to be dynamically inserted, in response to the detecting, into the electronic form presented on the web page as part of the electronic form.

2. The method of claim 1, comprising generating the object, the UI object configured to, in response to an activation event:
  access a form presented on a web page that displays the UI object,
  determine that the electronic form includes a field associated with an autofill tag, and
  populate the field associated with the autofill tag with an item from member data, the member data comprising information from a profile of a member of a on-line social networking system.

3. The method of claim 2, wherein the UI object is to access mapping information, the mapping information providing mapping between the autofill tag and the item from the member data.

4. The method of claim 3, wherein the mapping information is stored locally with respect to the web browser.

5. The method of claim 3, wherein the UI object is to access mapping information stored at the server system.

6. The method of claim 1, wherein the autofill tag is from a plurality of autofill tags, respective autofill tags from the plurality of autofill tags associated with respective fields of the form.

7. The method of claim 1 comprising communicating, to the web browser, a browser cookie, the browser cookie to per the server system to detect that the member of the on-line social networking system is accessing the web page via a web browser.

8. The method of claim 1, comprising communicating, to the web browser, an analytics script, the analytics script to report, to the server system, analytics with respect to events indicative of behavior of the member while the member is accessing the web page.

9. The method of claim 8, wherein the analytics comprises one or more of one or more events associated with activating the UI control, one or more events associated with submitting the form to a provider of the web page, and demographics of the member.

10. The method of claim 9, comprising communicating the analytics to a provider of the web page.

11. A computer-implemented system comprising:
  a web page access detector, implemented using at least one processor, to detect at a server system hosting an on-line social networking system, that a member of the on-line social networking system is accessing a web page via a web browser, the web page provided by an entity that is distinct from the on-line social networking system;
  a profile scraper, implemented using at least one processor, to obtain, from the on-line social networking system, member data, the member data associated with the member of the on-line social networking system; and
  communications module, implemented using at least one processor, to communicate the member data together with a user interface (UI) object to the web browser, the UI object configured to populate an electronic form presented on the web page with data obtained from the on-line social networking system, the UI object to be dynamically inserted, in response to the detecting, into the electronic form presented on the web page as part of the electronic form.

12. The system of claim 11, comprising a UI object generator, implemented using at least one processor, the UI object generator to generate the UI object, the UI object configured to, in response to an activation event:
  access a form presented on a web page that displays the UI object,
  determine that the electronic form includes a field associated with an autofill tag, and
  populate the field associated with the autofill tag with an item from member data, the member data comprising information from a profile of a member of a on-line social networking system.

13. The system of claim 12, wherein the UI object is to access mapping information, the mapping information providing mapping between the autofill tag and the item from the member data.

14. The system of claim 13, wherein the mapping information is stored locally with respect to the web browser.

15. The system of claim 13, wherein the UI object is to access mapping information stored at the server system.

16. The system of claim 11, wherein the autofill tag is from a plurality of autofill tags, respective autofill tags from the plurality autofill tags associated with respective fields of the form.

17. The system of claim 11, wherein the communications module is to communicate, to the web browser, a browser cookie, the browser cookie to permit the server system to detect that the member of the on-line social networking system is accessing the web page via a web browser.

18. The system of claim 11, wherein the communications module is to communicate to the web browser an analytics script, the analytics script to report, to the server system, analytics with respect to events indicative of behavior of the member while the member is accessing the web page.

19. The system of claim 18, wherein the analytics comprises one or more of one or more events associated with activating the UI control, one or more events associated with submitting the form to a provider of the web page, and demographics of the member.

20. A machine-readable non-transitory storage medium having instruction data to cause a machine to perform operations comprising:

detecting, a servers system hosting an on-line social networking system, that a member of the on-line social networking system is accessing a web page via a web browser, the web page provided by an entity that is distinct from the on-line social networking system;

obtaining, from the on-line social networking system, member data, the member data associated with the member of the on-line social networking system; and communicating the member data together with a user interface (UI) object to the web browser, the UI object configured to populate an electronic form presented on the web page with data obtained from the on-line social networking system, the UI object to be dynamically inserted, in response to the detecting, into the electronic form presented on the web page as part of the electronic form.

\* \* \* \* \*

UNITED STATES PATENT AND TRADEMARK OFFICE
CERTIFICATE OF CORRECTION

PATENT NO. : 9,218,332 B2  
APPLICATION NO. : 14/160080  
DATED : December 22, 2015  
INVENTOR(S) : Bhatia et al.

Page 1 of 1

It is certified that error appears in the above-identified patent and that said Letters Patent is hereby corrected as shown below:

In the claims,

In column 9, line 36, in Claim 2, before "object,", insert --UI--, therefor

In column 9, line 58, in Claim 7, after "claim 1", insert --,--, therefor

In column 9, line 59, in Claim 7, delete "per" and insert --permit--, therefor

In column 10, line 51, in Claim 16, after "plurality", insert --of--, therefor

In column 11, line 4, in Claim 20, delete "a servers" and insert --at a server--, therefor Signed and Sealed this
Seventeenth Day of May, 2016

Michelle K. Lee
*Director of the United States Patent and Trademark Office*